US011159406B2

(12) United States Patent
English et al.

(10) Patent No.: US 11,159,406 B2
(45) Date of Patent: *Oct. 26, 2021

(54) LOAD BALANCING WEB SERVICE BY REJECTING CONNECTIONS

(71) Applicant: Facebook, Inc., Menlo Park, CA (US)

(72) Inventors: Robert M. English, Menlo Park, CA (US); Jeffrey Rothschild, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,031

(22) Filed: Feb. 21, 2020

(65) Prior Publication Data

US 2020/0195537 A1    Jun. 18, 2020

Related U.S. Application Data

(63) Continuation of application No. 15/690,217, filed on Aug. 29, 2017, now Pat. No. 10,608,906, which is a continuation of application No. 14/285,162, filed on May 22, 2014, now Pat. No. 9,774,511, which is a continuation of application No. 12/651,069, filed on Dec. 31, 2009, now Pat. No. 8,769,541.

(51) Int. Cl.
    *H04L 12/26*    (2006.01)
    *G06F 9/50*     (2006.01)
    *H04L 12/911*   (2013.01)

(52) U.S. Cl.
    CPC ............ *H04L 43/08* (2013.01); *G06F 9/5083* (2013.01); *H04L 47/70* (2013.01)

(58) Field of Classification Search
    CPC ........ G06F 9/5083; H04L 43/08; H04L 47/70
    See application file for complete search history.

(56) References Cited

U.S. PATENT DOCUMENTS

| 5,815,662 A | 9/1998 | Ong |
| 6,675,220 B1 | 1/2004 | Bergamasco et al. |
| 6,880,156 B1 * | 4/2005 | Landherr ............... G06F 9/5083 709/229 |
| 7,139,939 B2 | 11/2006 | Greenlee et al. |
| 7,216,348 B1 | 5/2007 | deCarmo |
| 7,797,426 B1 | 9/2010 | Lyon |

(Continued)

OTHER PUBLICATIONS

Chieu T.C. et al., Dynamic Scaling of Web Applications in a Virtualized Cloud Computing Environment, Oct. 21-23, 2009, IEEE Xplore Digital Library, 281-286.

(Continued)

*Primary Examiner* — Jorge A Chu Joy-Davila
(74) *Attorney, Agent, or Firm* — Fenwick & West LLP

(57) ABSTRACT

A load balancer allocates requests to a pool of web servers configured to have low queue capacities. If the queue capacity of a web server is reached, the web server responds to an additional request with a rejection notification to the load balancer, which enables the load balancer to quickly send the rejected request to another web server. Each web server self-monitors its rejection rate. If the rejection rate exceeds a threshold, the number of processes concurrently running on the web server is increased. If the rejection rate falls below a threshold, the number of processes concurrently running on the web server is decreased.

14 Claims, 5 Drawing Sheets

(56) References Cited

U.S. PATENT DOCUMENTS

| | | |
|---|---|---|
| 8,064,342 B2 | 11/2011 | Badger |
| 8,159,961 B1 | 4/2012 | Rai et al. |
| 2003/0074467 A1 | 4/2003 | Oblak et al. |
| 2004/0044846 A1 | 3/2004 | Matthews et al. |
| 2004/0088424 A1 | 5/2004 | Park et al. |
| 2004/0177353 A1 | 9/2004 | Rao |
| 2006/0092827 A1 | 5/2006 | Jain |
| 2008/0216156 A1 | 9/2008 | Kosaka |
| 2010/0037038 A1 | 2/2010 | Bieswanger et al. |
| 2010/0120463 A1 | 5/2010 | Wang |

OTHER PUBLICATIONS

Suryanarayanan, K., "Performance Evaluation of New Methods of Automatic Redirection for Load Balancing of Apache Servers Distributed in the Internet," Proceedings of the 25th Annual IEEE Conference on Local Computer Networks, 2000, eight pages.

United States Office Action, U.S. Appl. No. 12/651,069, dated Aug. 1, 2013, 13 pages.

United States Office Action, U.S. Appl. No. 12/651,069, dated Nov. 2, 2012, 13 pages.

United States Office Action, U.S. Appl. No. 14/285,162, dated Jul. 14, 2016, 23 pages.

United States Office Action, U.S. Appl. No. 14/285,162, dated Sep. 11, 2015, 28 pages.

\* cited by examiner

LOAD BALANCING WEB SERVICE BY REJECTING CONNECTIONS

CROSS REFERENCE TO RELATED APPLICATION

This application is a continuation of U.S. application Ser. No. 15/690,217, filed Aug. 29, 2017, which is a continuation of U.S. application Ser. No. 14/285,162, filed May 22, 2014, which is a continuation U.S. application Ser. No. 12/651,069, filed Dec. 31, 2009, now U.S. Pat. No. 8,769,541, all of which are incorporated by reference in their entirety.

BACKGROUND

1. Field of Invention

The present invention relates to load balancing requests among a plurality of web servers.

2. Description of Related Art

Load balancing is a process of distributing a workload among a plurality of resources. The goals of load balancing may include improving resource utilization, maximizing throughput, minimizing response time, and avoiding overload. In addition, the ability to load balance among multiple machines may increase reliability through redundancy. Load balancing is commonly used to distribute tasks among a pool of web servers according to various scheduling algorithms. An apparatus that performs the load balancing according to a scheduling algorithm is referred to as a "load balancer."

One scheduling algorithm used by a load balancer for assigning work among a pool of web servers is round-robin scheduling. In round-robin scheduling, tasks are distributed in equal shares to each web server in circular order. Although round-robin scheduling equalizes the number of requests sent to each web server, the work to be done and the time needed to respond to those requests vary (i.e., the processing costs of responding vary). Thus, although the number of provided requests is equalized among the web servers, the costs are not equally distributed, and it may take some web servers longer to process their requests than other web servers. As a result, even though each of the web servers receives the same number of requests, the work queue for some web servers may grow long whereas other web servers may have few or no requests in their respective queues. Because response time is proportional to the number of requests in a queue, the average response time suffers when the number of queued requests becomes unequally distributed among web servers.

Typically, if a load balancer attempts to send an additional task to a server that is overloaded with tasks (i.e, the queue is full), the data packet representing the task is dropped. The load balancer has to wait for the expiration of a time period (i.e., a "time out") without receiving a response in order for the load balancer to conclude that the data packet representing the task should be sent to another server for processing. In an attempt to avoid these inefficiencies and to ensure all data packets are handled, many have suggested increasing the queue depth of the servers, for example from 32 to 64, and beyond. Alternatively, queues are configured so that requests are accepted and queued by overloaded servers. Although this avoids the wait and retry cycle described above, the inefficiencies implicit in the long times needed to process the requests in the queue of the overloaded servers remain.

SUMMARY

A load balancer allocates requests to a pool of web servers configured to have low queue capacities. If the queue capacity of a web server is reached, the web server responds to an additional request with a rejection notification to the load balancer. Because the load balancer is notified quickly of the rejection, the load balancer can send the request to another web server.

In one embodiment, each web server self-monitors its rejection rate. If the rejection rate exceeds a threshold, the number of processes concurrently running on the web server is increased. If the rejection rate falls below a threshold, the number of processes concurrently running on the web server is decreased.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Embodiments of the present invention provide systems, methods, and computer-readable storage media for load balancing work among a pool of web servers configured to have low queue capacities. A load balancer allocates requests to a plurality of web servers. When an additional request to a web server would exceed the queue capacity of the web server, the server sends a rejection notification to the load balancer, so that the load balancer can send the request to another web server. As a result, the average response time across all of the web servers is improved.

Figure 1:
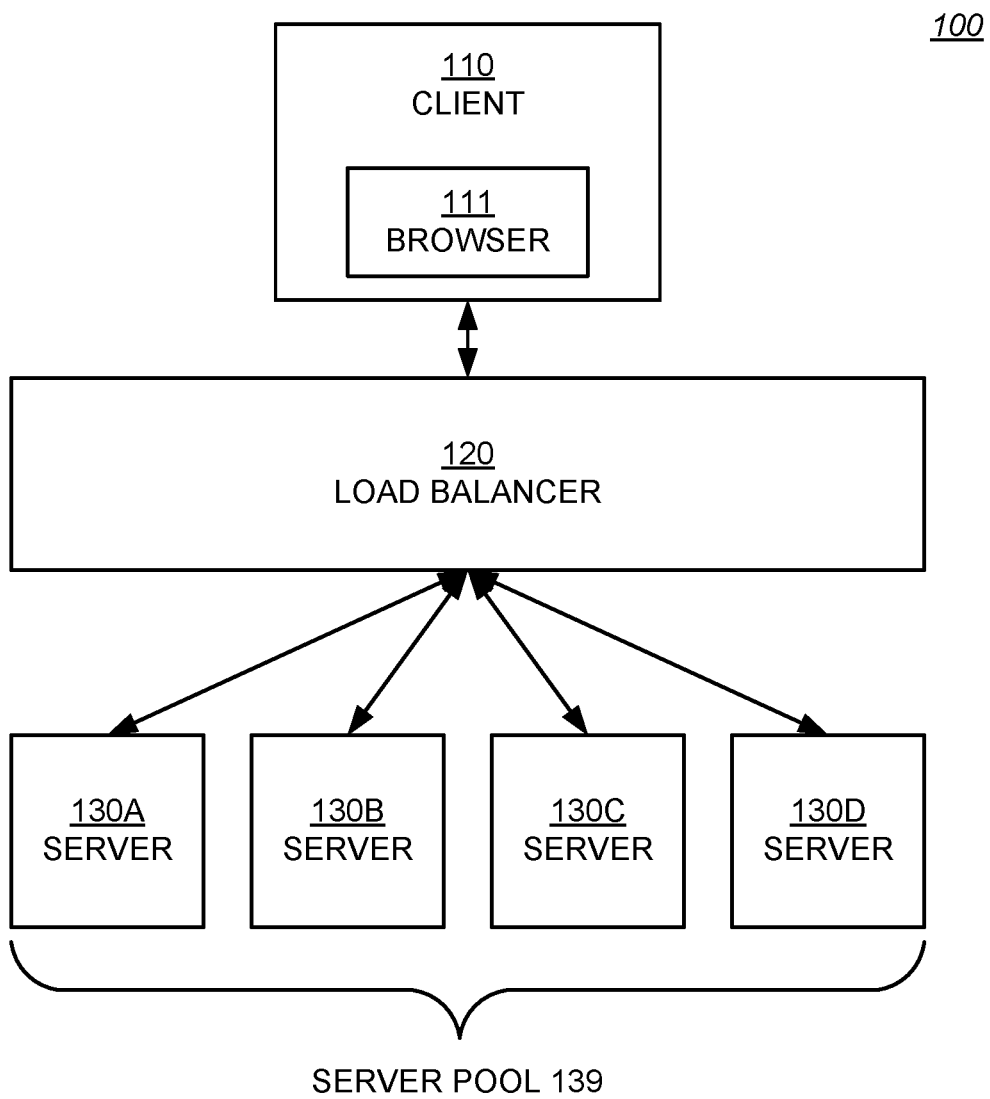
FIG. 1 is a high-level block diagram of an example computing environment in accordance with an embodiment.

FIG. 1 is an illustration of a computing environment 100 in accordance with one embodiment of the invention. The computing environment 100 includes a client 110, a load balancer 120, and a server pool 139 connected by a communications network (not shown). In various embodiments, the communications network is a local area network (LAN), a wide area network (WAN), a wireless network, an intranet, or the Internet, for example.

In various embodiments, the client 110 is a user computing device, such as a computer, a personal digital assistant (PDA), or a wireless telephone, that is equipped with a browser 111 for retrieving and displaying web pages. The browser 111 of the client 110 sends requests which comprise a collection of data packets used to establish a connection between the client 110 and a server so that subsequent streams of data can be exchanged. The requests can be provided in a variety of different forms, depending on the particular network and communications protocol. For example, for an environment using Internet protocols, the requests would be via TCP (Transmission Control Protocol) over IP (Internet Protocol); an environment using a non-IP protocol (e.g., a cellular phone network), other protocols would be used. Although only one client 110 is shown in FIG. 1 for simplicity, in practice, there would be large numbers (e.g., thousands, perhaps millions) of clients 110, each having a respective browser 111, present in the computing environment 100. For the purposes of explanation only then, an embodiment based on using TCP will be described.

The load balancer 120 receives TCP requests from clients 110 and allocates the requests among a server pool 139 according to a scheduling algorithm. Although only one load balancer 120 is shown in FIG. 1 for simplicity, any number of load balancers 120 can be present in the computing environment. In one implementation, each load balancer 120 has a separate server pool 139, whereas in other implementations two or more load balancers share a common server pool 139. Components of the load balancer 120 are described in greater detail with reference to FIG. 2, and the operation of the load balancer 120 in distributing requests will be described with reference to FIG. 4.

Figure 2:
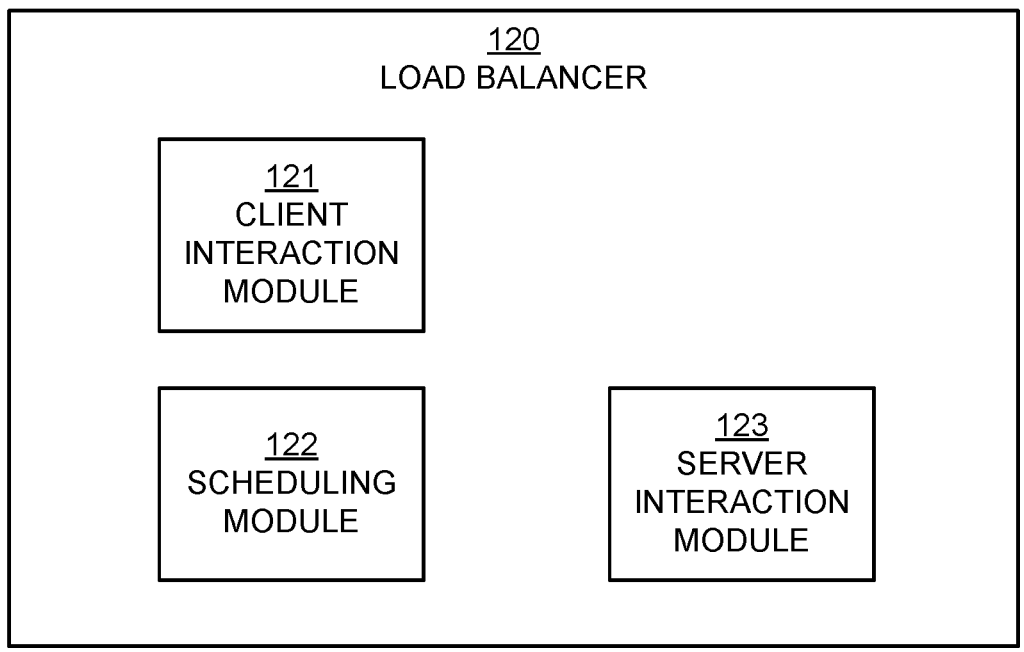
FIG. 2 is a block diagram of a load balancer in accordance with an embodiment.
Figure 4:
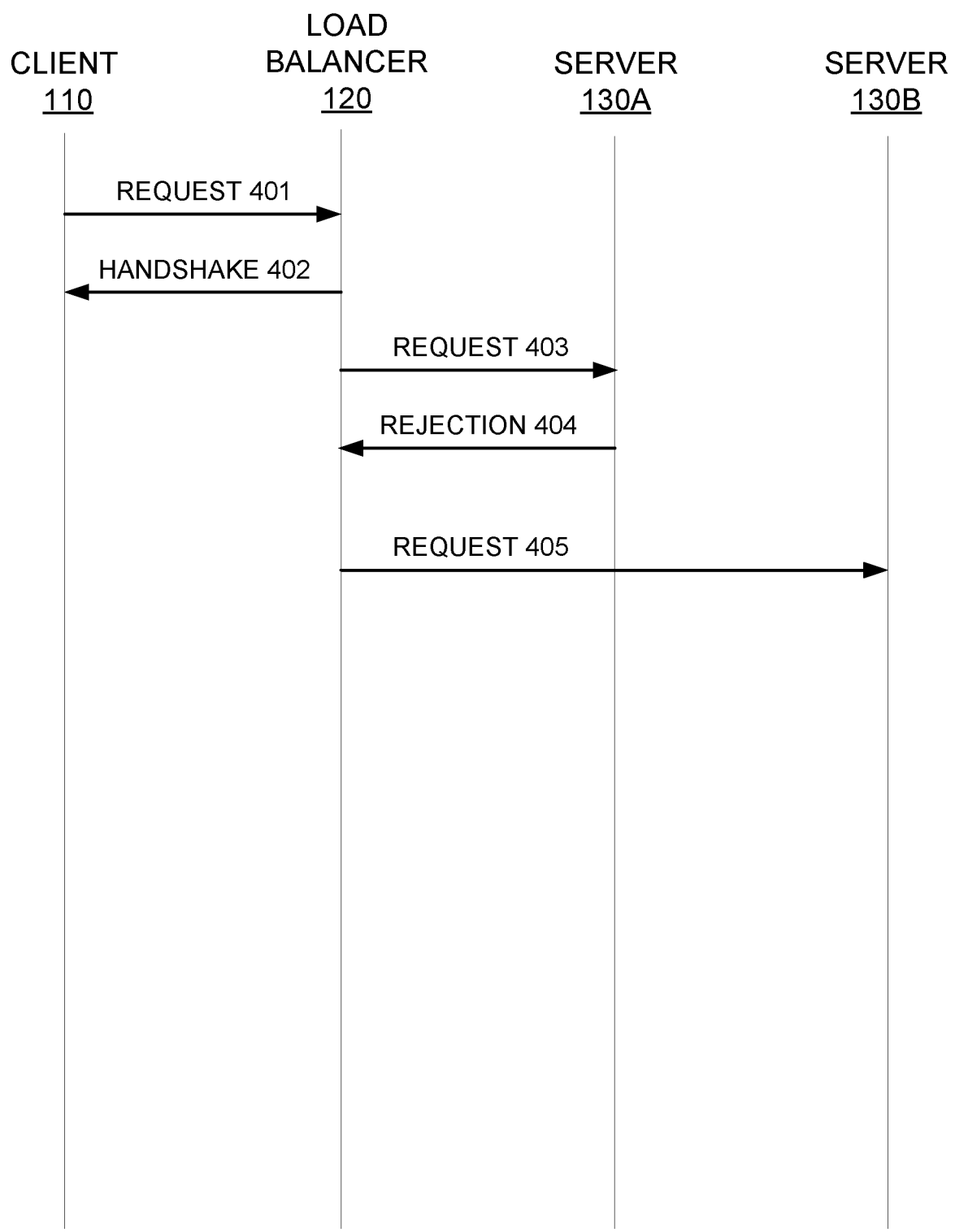
FIG. 4 is an interaction diagram illustrating a method of distributing requests among servers in accordance with an embodiment.

FIG. 2 is a block diagram of a load balancer 120 in accordance with an embodiment. The load balancer 120 includes a client interaction module 121, a scheduling module 122 and a server interaction module 123. FIG. 4 is an interaction diagram illustrating a method of distributing requests among servers 130A-D in accordance with an embodiment. Referring to both FIGS. 2 and 4, the client interaction module 121 of the load balancer 120 receives TCP requests 401 from clients 110. The client interaction module 121 also sends handshake information 402 to the client 110 to acknowledge the TCP request and passes the TCP requests to a scheduling module 122 of the load balancer.

The scheduling module 122 of the load balancer 120 implements a scheduling algorithm to allocate TCP requests among the server pool 139. In one embodiment, the scheduling algorithm is round-robin scheduling. In round-robin scheduling, each new TCP request is allocated to the next server in a list of servers in the server pool 139 until all servers 130A-D have been allocated one TCP request, at which point, the cycle begins again with allocating the next TCP request to the first server on the list. Other scheduling algorithms may also be used to distribute TCP requests among the server pool 139; for example, a weighted round-robin, random selection, fair queuing, and so forth.

Once a TCP request has been allocated by the scheduling module 122 of the load balancer 120, the server interaction module 123 of the load balancer 120 sends the TCP request 403 to the selected server, which in the example shown in FIG. 4 is server 103A. Should the selected server 130A not have capacity to handle the TCP request, the server interaction module 123 of the load balancer receives the rejection notification 404 sent from the server 130A. In one implementation, the TCP request is rejected in the network driver. By causing a rejection within TCP, the operating system can reject TCP requests with minimal overhead and latency. In one embodiment, the rejection notification includes a unique identifier of the TCP request so that the load balancer 120 can identify the TCP request that was rejected. From the load balancer 120 perspective, the rejection is a connection that reset prior to opening. The server interaction module 123 informs the scheduling module 122 of the rejection of the TCP request so that the TCP request can be reassigned, for example to an alternate server from among the server pool 139. In the example shown in FIG. 4, the TCP request is then sent 405 to server 130B. In one embodiment, if a particular TCP request has been rejected more than a threshold N number of times, e.g., 5 times (although higher or lower thresholds can be set), from various servers in the pool 139, the load balancer 120 sends the TCP request to an alternate port of one of the servers for priority treatment, or alternatively the load balancer 120 can be configured to send the TCP request to an overflow server outside the server pool 139. In one implementation, this is to prevent sudden changes in operation profile from halting the system. If the system is normally configured to reject 10% of requests at the web server level, N failures for a single request should be rare as long as the system is adapting properly. N failures is therefore taken as a signal that the system is not adapting properly, and the feedback loop, which is described in more detail below, is bypassed.

One advantage of some embodiments of the invention is that the load balancer 120 can efficiently allocate requests among the servers 130A-D without the need to maintain any state information for the servers 130A-D of the server pool 139. Therefore, there is no need to expend time or processing cycles to poll the servers for their status periodically or in advance of sending them requests and store the results to memory. Moreover, the cost of learning that a server is currently too busy to handle an additional request is merely the time it takes to send the request 403 to the server 130A and for the server 130A to send the rejection notification 404 to the load balancer 120. In one embodiment, the server 130A sends the rejection notification 404 substantially immediately upon receipt of the TCP request, and thus the cost can be approximated as the roundtrip time between the load balancer 120 and the server 130A. It is noted that this cost is only incurred when the selected server 130A-D is overloaded. Otherwise, the server 130A-D that receives the request simply queues the request for processing. In addition, sending a rejection notification 404 substantially immediately from the server 130A results in a significant response time performance improvement as compared to waiting for a TCP request to time out when an overloaded server fails to respond.

Referring back to FIG. 1, the computing environment 100 also includes a server pool 139. The server pool 139 is a collection of at least two servers 130A-D but could comprise any number of servers greater than two. The server pool 139 may be dedicated to one load balancer 120, or may be shared between multiple load balancers 120. As described above with reference to FIG. 4, the servers 130A-D of the server pool 139 receive TCP requests routed to them from clients 110 through the load balancer 120. If a server 103A is at capacity, the server 103A responds to a subsequent TCP request by sending a rejection notification 404 back to the load balancer 120 that sent the TCP request. Thus, the systems and methods of some embodiments described herein enable TCP requests from multiple load balancers 120 to be distributed among a shared server pool 139 in a method that reduces or optimizes response time without any of the multiple load balancers 120 having to maintain information regarding the workload of the servers among the server pool 139.

In one embodiment, each server 103A-D of the server pool 139 self-monitors its rejection rate. If the rejection rate exceeds a threshold, the number of processes concurrently running on the web server is increased in order to accommodate more TCP requests. If the rejection rate falls below a threshold, the number of processes concurrently running on the web server is decreased in order to improve the speed of the remaining processes. In some circumstances, the threshold rejection rate is measured as a number of rejections compared to the total number of requests, but other thresholds may also be used in other circumstances. Components of the servers 130A-D from the server pool 139 are described in greater detail with reference to FIG. 3, a method 500 of managing a server 130A-D having a static number of processes is described with reference to FIG. 5, and a method 600 of managing the number of processes concurrently executing in a server 103A-D is described with reference to FIG. 6.

Figure 3:
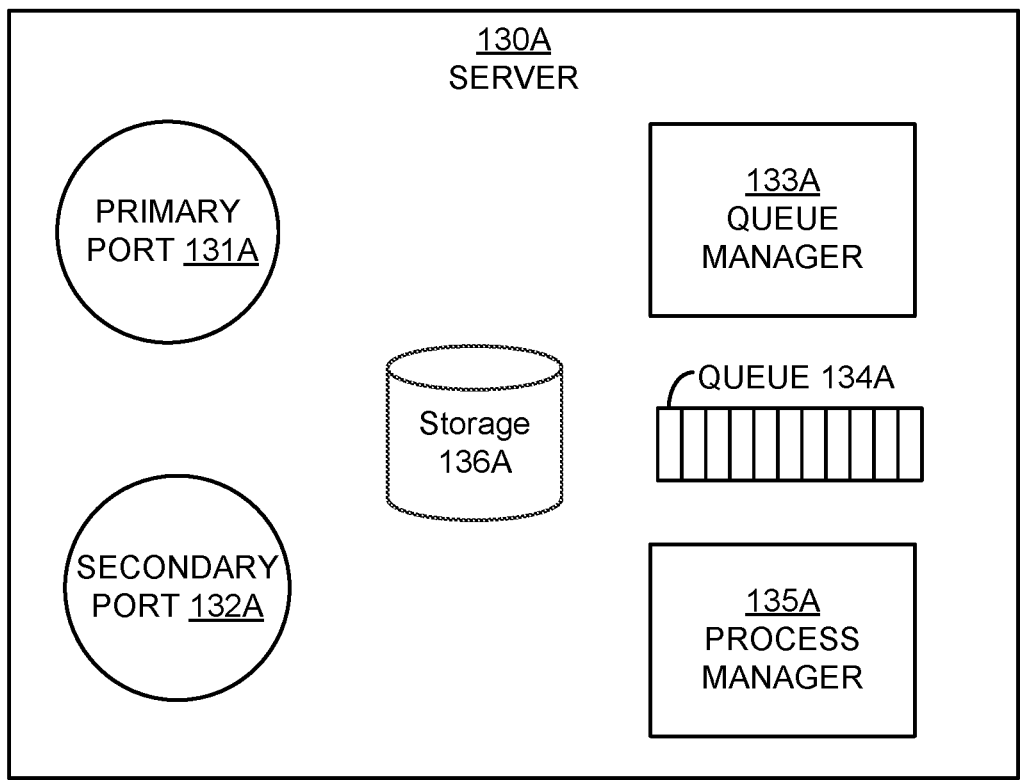
FIG. 3 is a block diagram of a server in accordance with an embodiment.

FIG. 3 is a block diagram of an example server 130A in accordance with an embodiment. The server 130A includes a primary port 131A, a secondary port 132A, a queue manager 133A, a queue 134A, a process manager 135A, and a local storage 136A.

The primary port 131A is the port through which the load balancer 120 communicates TCP requests to the server 130A. As discussed above, in one embodiment, if a particular TCP request has been rejected more than a threshold number of times from various servers in the pool 139, the load balancer 120 sends the TCP request to an alternate port, i.e., the secondary port 132A of a server 130A. In one embodiment, the TCP request sent to the secondary port receives priority treatment, such as being placed in another queue (not shown) that is processed ahead of the normal queue 134A, or being placed at the front of the normal queue 134A. In another embodiment, TCP requests received through the secondary port 132 are not rejected, regardless of how full the queue 134A is. In one implementation, the queue manager 133A holds the TCP request received through the secondary port 132A until a space opens in the queue 134A into which the TCP request can be placed. In another embodiment, requests sent to the secondary port are placed in a secondary queue that is equally treated by the server 130A. The presence of a request in the secondary queue is taken as a strong signal by the server 130A that additional processes are needed in order to accept more requests from the load balancer 120.

Referring to FIG. 3, each server of the server pool 139 has a queue 134A. The queue 134A is a location storing an ordered list of TCP requests waiting to be processed by the server 130A. In one embodiment, the servers 130A-D of the server pool 139 are configured, for example by setting the ListenBacklog parameter in Apache, so that each server has a low queue capacity. In a standard Linux kernel, the ListenBacklog can be set at the lowest to 1. A queue capacity of 1 means that the server only accepts a request if it is able to begin processing the request as the next task. Otherwise, the server sends a rejection notification so that the load balancer 120 can send the request to another server that can process the request as its next task. This results in the best response time performance.

A queue capacity of 1 is preferred in some implementations, but queue capacities higher than 1 (e.g., 2) can also be used depending in part on the number of servers in the server pool 139 and the expected workload on them. Alternatively, a queue capacity of 0 may be preferred for servers that support such configuration. A queue capacity of 0 means that the queue accepts new requests only when a process is known to be ready to accept new work.

Keeping the queue capacity low functions to limit how disproportionate the workload between servers 130A-D in the server pool 139 can be. In other words, if the queue 134A of one server 130A of the server pool 139 is large, it is easier for a large queue of TCP requests to accumulate at that server while another server 103B-D may have no work to do. A low queue capacity caps the number of requests that are ageing in one queue rather than being processed by another server 130B-D that may be less busy. Another reason for a low queue capacity is to limit the time requests spend in the queue before processing starts. As a result, configuring servers 130A-D with low queue capacities can result in an overall improvement in response time performance. For example, if the request rates is low (for example one request per second average service rate), a queue length of 1 allows requests to sit in the queue unprocessed for up to a second (half of a second on average). However, at higher request rates, the time spent in the queue is less, so the difference in performance between a queue length of zero and one can become insignificant.

In one variation, although a queue capacity of one is preferred in some implementations, an exception would be cases where the system as a whole needs to serve a given number of requests, but the number of requests an individual server can handle is limited by resource constraints. In this case, instead of increasing the number of processes, the feedback loop, which will be described in more detail below, keeps the queue depth balanced across all nodes by increasing the queue depths, so that individual requests are served as quickly as possible.

Figure 5:
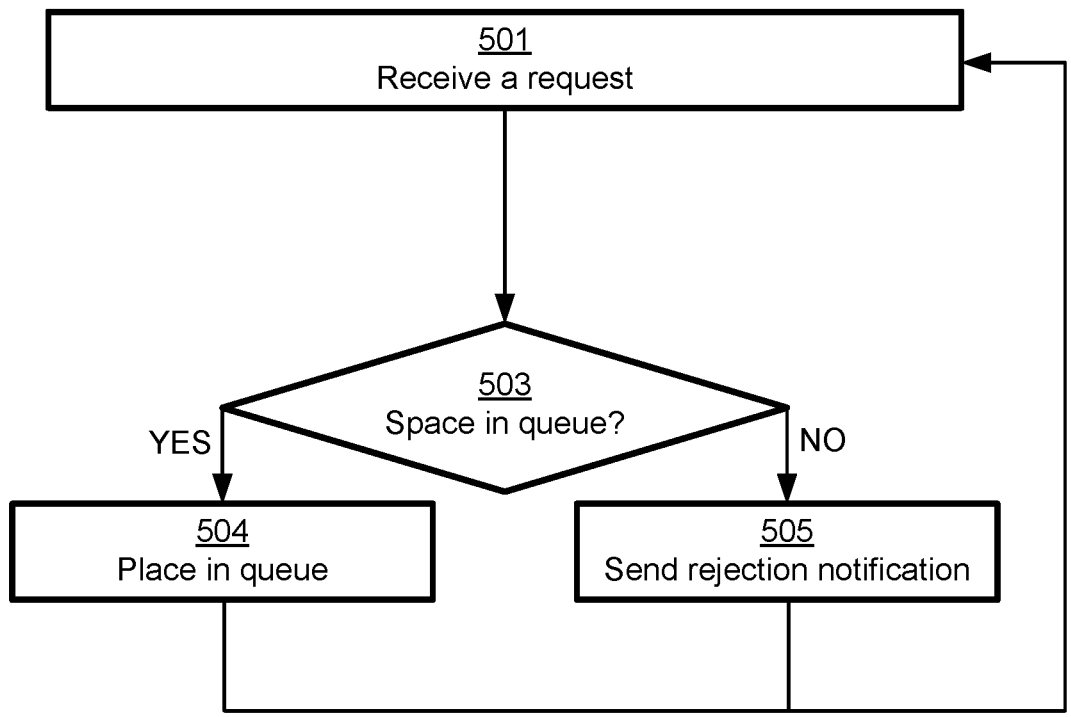
FIG. 5 is a flow chart illustrating a method managing a server in accordance with an embodiment.

A method 500 of managing a server having a static number of processes will now be described with reference to FIG. 5. In step 501, the server receives a TCP request, for example, through the primary port 131A. The queue manager 133A then determines 503 whether there is space for the TCP request in the queue 134A. If there is space in the queue 134A, in step 504 the queue manager 133A places the TCP request at the end of the queue. If there is not space in the queue 134A, in step 505 the queue manager 133A sends a rejection notification on behalf of the server 130A to the load balancer 120. In one embodiment, the rejection notification is sent to the load balancer 120 substantially immediately. In the case where the server 130A has a static number of processes, after the request is placed in the queue 504 or a rejection notification is sent 505, the method 500 returns to step 501.

Figure 6:
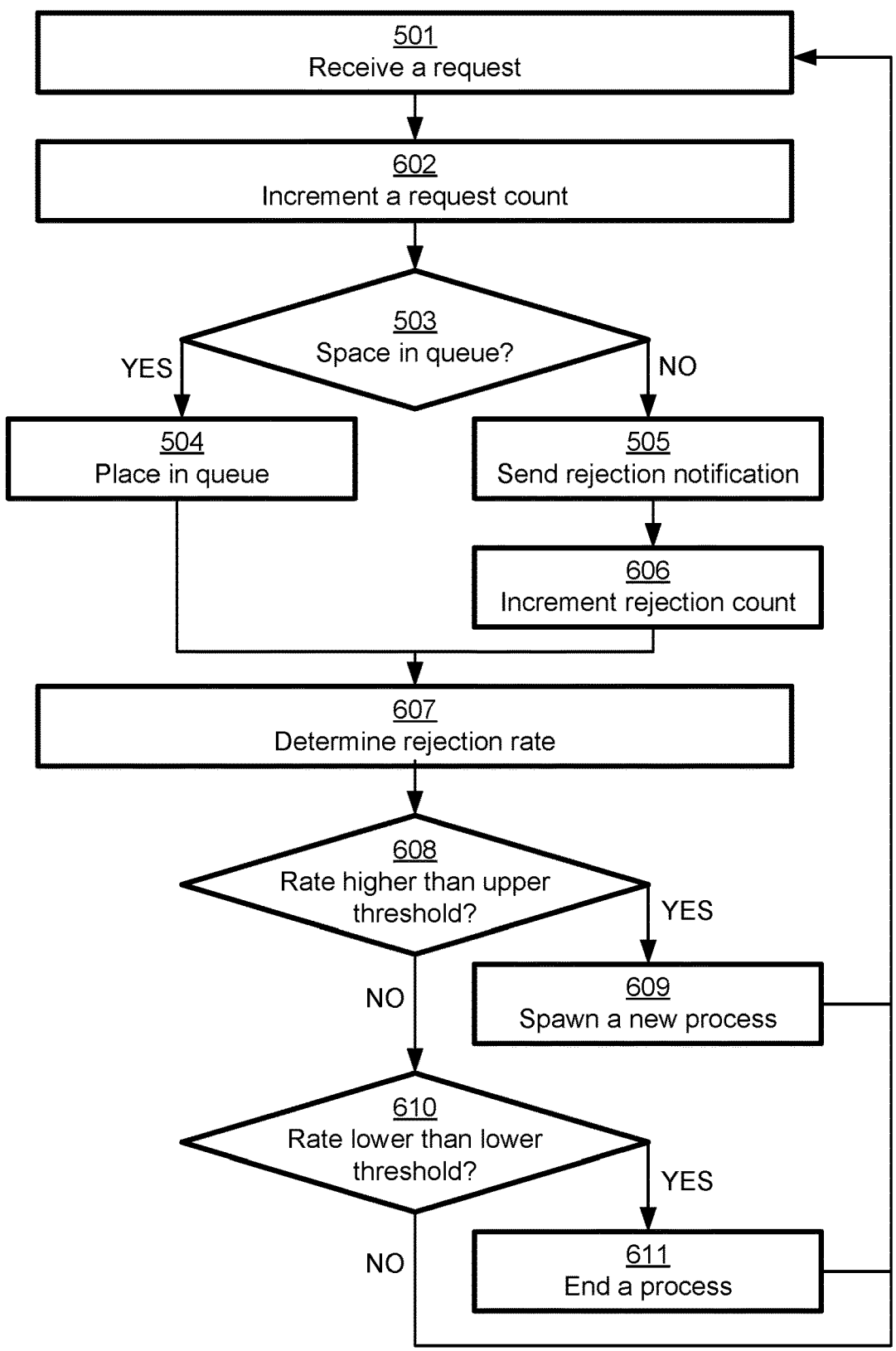
FIG. 6 is a flow chart illustrating a method of managing the number of processes concurrently executing in a server in accordance with an embodiment.

A method 600 of managing a server having a dynamic number of processes that can change depending on the work load will now be described with reference to FIG. 6. The steps of the method 600 are the same as for the method 500 for steps 501 and 503-505. However, in response to receiving a TCP request 501, in step 602, the queue manager 133A increments a count of requests that have been received by the server 130. The queue manager 133A can store the count of requests that have been received in the local storage 136A, for example. Then, after the request is placed in the queue 504 or a rejection notification is sent 505, in step 606, the queue manager 133A increments a count of the number of rejections that the queue manager 133A has sent in response to TCP requests. The queue manager 133A can also store the count of rejections in local storage 136A, for example.

In step 607, the rejection rate is determined, for example, by dividing the count of the number of rejections by the total count of the requests that have been received by the server 130A. Alternatively, other techniques for comparing the number of rejections to the number of TCP requests (e.g., received total or within a given time period), or comparing the number of rejections to the number of TCP requests accepted (i.e., added to the queue 134A) can also be used. In one embodiment, the process manager 135A of the server 130A determines the rejection rate by pulling the relevant numbers from local storage 136A.

In step 608, the process manager 135A of the server 130A determines whether the rejection rate is higher than an upper threshold. In other words, the process manager 135A determines whether the server 130A is rejecting too many TCP requests. The upper threshold is a number that can be adjusted to reflect a policy decision regarding the utilization of resources. The higher the rejection rate is, the larger the load on the load balancer 120 is and the larger the latency added to requests becomes. The lower the rejection is, the less effective load balancing becomes. An appropriate threshold is set with reference to these relative costs and benefits in a particular environment. In one embodiment, the threshold is set at 5%, but smaller and greater thresholds can also be used. A rejection rate of 5% can provide effective load balancing while increasing the number of load balancer 120 retries by only 5%. In some implementations, the upper threshold is allowed to vary with load.

In step 609, if the rejection rate exceeds the upper threshold, the process manager 135A spawns a new process to run in parallel with the processes currently executing on the server 130A. Each process pulls the first TCP request from the queue 134A and processes it. Due to the additional processing requirements of the new process, all of the existing processes on the server 130A run at a slightly decreased speed when the new process is added. However, by spawning a new process, the server 130A will be able to process additional TCP requests which will increase the server's 130A throughput. Thus, with an added process, the server's rejection rate is expected to decrease, particularly if the rate of receipt of TCP requests remains the same. While the additional process increases the throughput of the system, it also increases the response time seen by requests. In other words, the server processes more requests, but it does so less effectively.

In step 610, the process manager 135A of the server 130A determines whether the rejection rate is lower than a lower threshold. In other words, the process manager 135A determines whether the server 130A is not rejecting enough TCP requests. If a relative few number of TCP requests are rejected, it is a sign that the server 130A is not being used at capacity. The lower threshold is a number that can be adjusted to reflect a policy decision regarding the utilization of resources. The lower the threshold is, the less effective the load balancing. In one embodiment, the threshold is set at 3%, but smaller or greater thresholds can also be used. In some implementations, the lower threshold is allowed to vary with load. In one implementation, as long as the network round trip time (RTT) is small compared to request service time, it is desirable to keep the threshold high, so that rebalancing happens on small deviations from the mean process load.

Another factor that is considered is the time it takes to "spawn" and "despawn" a process, which depends on the particular web server. In some implementations, it is preferred to enable and disable processes (or block and unblock). These actions are typically less expensive operations that can be performed more frequently. As used herein, "spawning a new process" refers to increasing the number of processes concurrently processing requests on the web server using any of these techniques. As used herein, "ending a process" refers to decreasing the number of processes concurrently processing requests on the web server using any of these techniques.

In step 611, if the rejection rate is below the lower threshold, the process manager 135A ends one of the processes that is currently processing TCP requests on the server 130A. By deleting a process, all of the remaining processes on the server 130A run at a slightly increased speed. Thus, although the server 130A will not be able to process as many TCP requests in parallel, each one will be processed faster. However, with a lower number of processes, the server's rejection rate is expected to increase, particularly if the rate of receipt of TCP requests remains the same.

If, as a result of steps 608 and 610, it is determined that the rejection rate falls within the upper and lower thresholds, the number of concurrently executing processes is maintained for the moment. With subsequent passes through the method 600, the rejection rate may creep up or down, which will result in an appropriate adjustment to the number of processes. Accordingly, by self-monitoring the server's 130A rejection rate, the server 130A can beneficially manage the number of processes concurrently executing to improve response time performance.

The present invention has been described in particular detail with respect to several possible embodiments. Those of skill in the art will appreciate that the invention may be practiced in other embodiments. For example, embodiments of the invention have been described in the context of a social network environment. However, it is appreciated that embodiments of the invention may also be practiced in other communications network environments that include components to enable the purchasing of interactive applications and content, and the tracking of licenses and sublicenses as described above. For example, outside the context of the social network provider, any payment provider and/or application developer can manage a system wherein a first user who purchases a use license can also purchase a license to redistribute the application to others or to grant sublicenses to the application. In such circumstances, the payment provider and/or application developer tracks the sublicenses distributed by the first user and allows access to the application by the first user having the license and all additional users having a sublicense.

The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method comprising:
   receiving, at a web server of a pool of web servers, the web server comprising one or more processors configured to concurrently execute one or more processes, a first request from a client via a load balancer, the web server having a capacity, wherein the capacity is a number of processes that are available to process requests from a first queue, wherein the load balancer is configured to assign requests to the pool of web servers;
   responsive to the first queue being full, sending, by the web server, a rejection notification to the load balancer to allow the load balancer to send the rejected first request along with a first unique identifier of the rejected first request to another web server in the pool;
   determining, by the web server, a rejection rate by dividing a number of rejection notifications sent to the load balancer by a total number of requests received by the web server during a set amount of time;
   responsive to the rejection rate exceeding an upper threshold, increasing, by the web server, the capacity of the web server by increasing a number of processes that are able to process requests; and
   responsive to increasing the number of processes, processing, by the web server, a second request having a second unique identifier received at a secondary queue, wherein the second request is received, by the web server from the load balancer, at the secondary queue of the web server for priority treatment responsive to the second request being rejected a predetermined number of times by one or more web servers of the pool of web servers.

2. The method of claim 1, further comprising:
   responsive to space being available in the first queue, placing a third request having a third unique identifier in the first queue.

3. The method of claim 1, wherein the web server is configured to have a queue capacity of one, wherein the queue capacity is a number of requests the first queue can hold.

4. The method of claim 1, further comprising:
   resetting the number of requests received and the number of rejection notifications sent to the load balancer every set amount of time.

5. The method of claim 1, wherein at least one of the first request and the second request comprises a TCP request.

6. A web server of a pool of web servers, the web server having a capacity which is a number of processes that are available to process requests from a first queue, wherein the web server comprises:
   one or more processors configured to concurrently execute one or more processes; and
   a non-transitory computer readable storage medium storing instructions, the instructions,
      when executed by the one or more processors, cause the one or more processors to:
      receive a first request from a client via a load balancer, the load balancer configured to assign requests to the pool of web servers;
      responsive to the first queue being full, send a rejection notification to the load balancer to allow the load balancer to send the rejected first request along with a first unique identifier of the rejected first request to another web server in the pool;
      determine a rejection rate by dividing a number of rejection notifications sent to the load balancer by a total number of requests received by the web server during a set amount of time;
      responsive to the rejection rate exceeding an upper threshold, increase the capacity of the web server by increasing a number of processes that are able to process requests; and
      responsive to increasing the number of processes, processing a second request having a second unique identifier received at a secondary queue, wherein the second request is received from the load balancer at the secondary queue for priority treatment responsive to the second request being rejected a predetermined number of times by one or more web servers of the pool of web servers.

7. The web server of claim 6, wherein the instructions further cause the one or more processors to:
   responsive to space being available in the first queue, place a third request in the first queue.

8. The web server of claim 6, wherein the web server is configured to have a queue capacity of one, wherein the queue capacity is a number of requests the first queue can hold.

9. The web server of claim 6, wherein the instructions further cause the one or more processors to:
   reset a count of the number of requests received and a count of the number of rejection notifications sent to the load balancer every set amount of time.

10. The web server of claim 6, wherein the first request comprises a TCP request.

11. A non-transitory computer readable storage medium storing instructions, the instructions, when executed by one or more processors configured to concurrently execute one or more processes, cause the one or more processors to:
   receive, at a web server of a pool of web servers, a first request from a client via a load balancer, the web server having a capacity, wherein the capacity is a number of processes that are available to process requests from a first queue, wherein the load balancer is configured to assign requests to the pool of web servers;
   responsive to the first queue being full, send a rejection notification to the load balancer to allow the load balancer to quickly send the rejected first request along with a first unique identifier of the rejected first request to another web server in the pool;
   determine a rejection rate by dividing a number of rejection notifications sent to the load balancer by a total number of requests received by the web server during a set amount of time;
   responsive to the rejection rate exceeding an upper threshold, increase the capacity of the web server by increasing a number of processes that are able to process requests; and
   responsive to increasing the number of processes, processing, by the web server, a second request having a second unique identifier received at a secondary queue, wherein the second request is received, by the web server from the load balancer, at the secondary queue of the web server for priority treatment responsive to the second request being rejected a predetermined number of times by one or more web servers of the pool of web servers.

12. The non-transitory computer readable storage medium of claim 11, wherein the instructions further cause the one or more processors to:
   responsive to space being available in the first queue, place a third request having a third unique identifier in the first queue.

13. The non-transitory computer readable storage medium of claim 11, wherein the first queue has a queue capacity of one, wherein the queue capacity is a number of requests the first queue can hold.

14. The non-transitory computer readable storage medium of claim 11, wherein the instructions further cause the one or more processors to:
   reset a count of the number or requests received and a count of the number of rejection notifications sent to the load balancer every set amount of time.

* * * * *